(12) United States Patent
Sawada et al.

(10) Patent No.: US 9,494,956 B2
(45) Date of Patent: Nov. 15, 2016

(54) POWER SUPPLY DEVICE AND METHOD OF CONTROLLING THE POWER SUPPLY DEVICE

(71) Applicant: MITSUBISHI ELECTRIC CORPORATION, Chiyoda-ku, Tokyo (JP)

(72) Inventors: Akihiro Sawada, Chiyoda-ku (JP); Naoki Itoi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 666 days.

(21) Appl. No.: 14/037,981

(22) Filed: Sep. 26, 2013

(65) Prior Publication Data

US 2014/0306681 A1  Oct. 16, 2014

(30) Foreign Application Priority Data

Apr. 16, 2013  (JP) ................. 2013-085549

(51) Int. Cl.
  *G05F 1/46*  (2006.01)
  *H02M 3/158*  (2006.01)
  *H02J 7/14*  (2006.01)

(52) U.S. Cl.
  CPC ............. *G05F 1/46* (2013.01); *H02M 3/1582* (2013.01); *H02J 7/1446* (2013.01); *Y02T 10/92* (2013.01)

(58) Field of Classification Search
  CPC ........................................ G05F 1/46
  See application file for complete search history.

(56) References Cited

U.S. PATENT DOCUMENTS

| | | | |
|---|---|---|---|
| 2010/0289459 A1* | 11/2010 | Kihara | H02J 7/1492 322/7 |
| 2011/0285361 A1* | 11/2011 | Kihara | H02P 9/48 322/28 |

FOREIGN PATENT DOCUMENTS

| | | | |
|---|---|---|---|
| JP | 4931987 B2 | 5/2012 | |
| JP | 5008749 B2 | 8/2012 | |

* cited by examiner

*Primary Examiner* — Thienvu Tran
*Assistant Examiner* — Pinping Sun
(74) *Attorney, Agent, or Firm* — Sughrue Mion, PLLC; Richard C Turner (57) ABSTRACT

A voltage control unit is configured to: control, in accordance with an output voltage signal and an output current signal, output power of a rectifying unit to a voltage lower than a voltage by which an amount of generated power of a magneto AC generator becomes maximum; control a transformation ratio in accordance with the output voltage signal and the output current signal so as to improve power generation efficiency of the magneto AC generator one of when an rpm variation signal indicates an decelerating state and when the rpm variation signal indicates that a variation in rpm indicates a value smaller than a predetermined constant; and control the transformation ratio so as to decrease the output power of the rectifying unit when the rpm variation signal indicates an accelerating state.

11 Claims, 8 Drawing Sheets

POWER SUPPLY DEVICE AND METHOD OF CONTROLLING THE POWER SUPPLY DEVICE

BACKGROUND OF THE INVENTION

1. Field of the Invention

The present invention relates to a power supply device using a magneto AC generator and a method of controlling the power supply device.

2. Description of the Related Art

As a power supply device, there are conventionally known, for example, power supply devices each using a magneto AC generator disclosed in JP 4931987 B or JP 5008749 B. Such power supply device generally includes a magneto AC generator, a rectifier circuit, and a generated voltage control circuit. Electric power generated by the magneto AC generator is converted into a DC by the rectifier circuit, and then input to the generated voltage control circuit. The generated voltage control circuit performs short-circuit control so as to obtain a voltage in accordance with, for example, a voltage of an electrical load including an electrical storage device, to thereby supply the electric power to the electrical load.

However, the conventional technologies have the following problems.

In the conventional power supply device using the magneto AC generator, the generated voltage of a generator alone is controlled in accordance with the voltage of the electrical load. For this reason, the generator is required to generate electric power with a single generated voltage. Meanwhile, in the magneto AC generator, a generated voltage by which power generation efficiency becomes the maximum differs depending on rpm of a rotor. Therefore, the generator of the conventional power supply device does not necessarily generate electric power with the generated voltage by which the power generation efficiency becomes excellent.

Further, in the generated voltage control circuit, electric power supply to the electrical load is controlled only in accordance with a state of the electrical load. However, in the case of a motor that includes a power supply device mounted thereon, for example, a state of a torque supplying device (engine in a case of automobile) for a generator varies constantly. Therefore, even in a case where the torque supplying device is operated with high load and low efficiency, power generation is performed only in accordance with the state of the electrical load, which is inefficient.

On the other hand, in the magneto AC generator, the amount of generated power differs depending on the rpm of the rotor. The magneto AC generator of the conventional power supply device therefore does not always perform power generation necessary for the electrical load.

In order to solve the problems described above, a rectifier circuit and a short circuit provided at an output terminal of the magneto AC generator are switched in accordance with an operating state of the rotor or the torque supplying device, to thereby reduce input torque and improve power generation efficiency. In the case of switching to the short circuit, however, the input torque can be reduced but the power generation cannot be performed at all. Further, when the rectifier circuit and the short circuit are switched, the torque changes abruptly, resulting in deterioration in ride quality in the case of a vehicle.

For the improved power generation efficiency, the generated voltage is switched for each rpm range so as to use a range having high power generation efficiency. However, the input voltage is classified on an rpm range basis, and hence electric power cannot be always generated with the highest efficiency. Further, the DC voltage transformer does not have a boost function, and hence, when a voltage for obtaining the highest efficiency is equal to or lower than an output voltage, electric power cannot be generated with the highest efficiency, and the amount of generated power is reduced.

SUMMARY OF THE INVENTION

The present invention has been made for solving the problems described above, and it is an object thereof to provide a power supply device and a method of controlling the power supply device, which are capable of improving power generation efficiency more than in the conventional case and reducing input torque with the use of a magneto AC generator.

According to one embodiment of the present invention, there is provided a power supply device, including: a magneto AC generator including: a rotor including a permanent magnet; and a stator configured to generate an AC current in a stator winding by rotation of the rotor; a rectifying unit configured to rectify the AC current generated by the magneto AC generator into a DC current; an electrical load to be supplied with electric power generated by the magneto AC generator; a DC voltage transformer having a variable transformation ratio, which is configured to transform an output voltage of the rectifying unit into an input voltage between input terminals of the electrical load; a voltage/current detecting unit configured to detect an output voltage signal and an output current signal of the DC voltage transformer; and a voltage control unit configured to control the transformation ratio of the DC voltage transformer in a stepless manner within a set range based on an operating state signal including an rpm variation signal relating to the rotation of the rotor, the output voltage signal, and the output current signal, in which the voltage control unit is configured to: control, in accordance with the output voltage signal and the output current signal, output power of the rectifying unit to a voltage lower than a voltage by which an amount of generated power of the magneto AC generator becomes maximum; control the transformation ratio in accordance with the output voltage signal and the output current signal so as to improve power generation efficiency of the magneto AC generator one of when the rpm variation signal indicates an decelerating state and when the rpm variation signal indicates that a variation in rpm indicates a value smaller than a predetermined constant; and control the transformation ratio so as to decrease the output power of the rectifying unit when the rpm variation signal indicates an accelerating state.

According to one embodiment of the present invention, there is also provided a method of controlling a power supply device, the power supply device including: a magneto AC generator including: a rotor including a permanent magnet; and a stator configured to generate an AC current in a stator winding by rotation of the rotor; a rectifying unit configured to rectify the AC current generated by the magneto AC generator into a DC current; an electrical load to be supplied with electric power generated by the magneto AC generator; a DC voltage transformer having a variable transformation ratio, which is configured to transform an output voltage of the rectifying unit into an input voltage between input terminals of the electrical load; a voltage/current detecting unit configured to detect an output voltage signal and an output current signal of the DC voltage transformer; and a voltage control unit configured to control the transformation ratio of the DC voltage transformer in a stepless manner within a set range based on an operating state signal including an rpm variation signal relating to the rotation of the rotor, the output voltage signal, and the output current signal, the method including: controlling, in accordance with the output voltage signal and the output current signal, output power of the rectifying unit to a voltage lower than a voltage by which an amount of generated power of the magneto AC generator becomes maximum; controlling the transformation ratio in accordance with the output voltage signal and the output current signal so as to improve power generation efficiency of the magneto AC generator one of when the rpm variation signal indicates an decelerating state and when the rpm variation signal indicates that a variation in rpm indicates a value smaller than a predetermined constant; and controlling the transformation ratio so as to decrease the output power of the rectifying unit when the rpm variation signal indicates an accelerating state.

According to the power supply device and the method of controlling the power supply device of the present invention, the voltage control unit (control step) is configured to: control, in accordance with the output voltage signal and the output current signal, the output power of the rectifying unit to a voltage lower than the voltage by which the amount of generated power of the magneto AC generator becomes maximum; control the transformation ratio in accordance with the output voltage signal and the output current signal so as to improve the power generation efficiency of the magneto AC generator when the rpm variation signal indicates the decelerating state or indicates that the variation in rpm is smaller than the predetermined constant; and control the transformation ratio so as to decrease the output power of the rectifying unit when the rpm variation signal indicates the accelerating state.

Therefore, the power generation efficiency can be improved more than in the conventional case and the input torque can be reduced with the use of the magneto AC generator.

DETAILED DESCRIPTION OF THE PREFERRED EMBODIMENTS

Referring to the accompanying drawings, a power supply device and a method of controlling the power supply device according to exemplary embodiments of the present invention is described below. In the drawings, the same or corresponding parts are denoted by the same reference symbols.

The power supply device according to the present invention generates electric power with such a generated voltage that improves power generation efficiency compared with that of the conventional power supply device, and also transforms a voltage in accordance with a voltage of the electrical load by the DC voltage transformer so that an output current higher than that of the conventional power supply device can be obtained.

In addition, the generated voltage of the above-mentioned generator is controlled and is transformed in accordance with the voltage of the electrical load by the DC voltage transformer, which enables control of the generated current. Therefore, in a case where control is performed so that the generated current is suppressed, input torque (input energy) from the torque supplying device is suppressed, which enables a reduction in load of the torque supplying device.

Further, when a vehicle is decelerating, control is performed to follow voltage-power characteristics at each rpm so that the generated voltage of the generator is controlled to a voltage by which the amount of generated power becomes maximum, and hence the torque can be effectively used. When the vehicle is accelerating, on the other hand, control is performed to follow the voltage-power characteristics at each rpm so that the generated voltage of the generator is controlled to a voltage by which the amount of generated power becomes minimum, and hence the torque can be reduced.

First Embodiment

Figure 1:
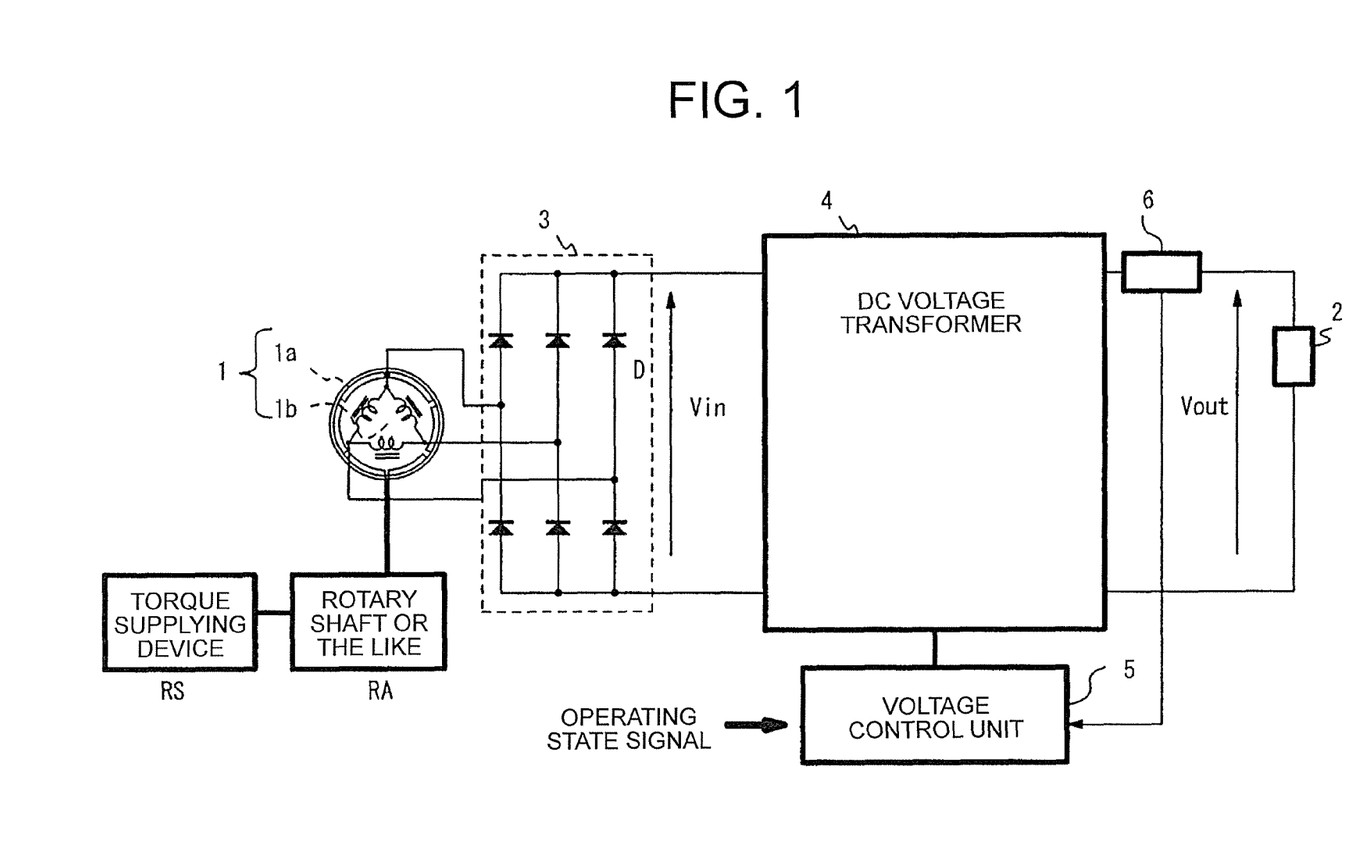
FIG. 1 is an overall configuration diagram illustrating a power supply device according to a first embodiment of the present invention.

FIG. 1 is a diagram illustrating an overall structure of a power supply device according to a first embodiment of the present invention. In FIG. 1 the power supply device includes: a magneto AC generator 1 (hereinafter referred to as magneto generator 1); an electrical load 2 including an electrical storage device, which is supplied with electric power generated by the magneto generator 1; a rectifying unit 3 that rectifies an AC current generated by the magneto generator 1 to a DC current; a DC voltage transformer 4 for changing a voltage ratio between an output voltage of the rectifying unit 3 and an input voltage of the electrical load 2; a voltage control unit 5 that controls the transformation ratio; and a voltage/current detecting unit 6 for detecting an output voltage signal and an output current signal of the DC voltage transformer 4.

The magneto generator 1 is formed of a rotor 1a and a stator 1b. The rotor 1a includes magnetic field magnets (permanent magnets) divided into a plurality of pieces toward an inside of a cylindrical supporting member along a rotation direction (circumferential direction). The stator 1b includes stator windings that are delta-connected. The rotor 1a is connected to a rotary shaft RA that transmits rotation of a torque supplying device RS. For example, in a case of an on-vehicle power supply device, the torque supplying device RS is an internal combustion engine, and the rotor 1a is directly coupled to a crank shaft of the internal combustion engine or is connected to the rotary shaft RA that is connected to the crank shaft via a belt, a gear, or the like.

Here, the rotor 1a rotates along with rotation of the rotary shaft RA to generate an AC current in the stator windings of the stator 1b. The AC current generated in the stator 1b is rectified to a DC current by a three-phase diode bridge formed by six diodes D provided in the rectifying unit 3.

The DC voltage transformer 4 transforms an input voltage Vin of the DC voltage transformer 4 into an output voltage Vout of the DC voltage transformer 4, and then supplies the electrical load 2 with the output voltage Vout. A transformation ratio (Vout/Vin) on this occasion is controlled by the voltage control unit 5 in accordance with a signal indicating an operating state of the magneto generator 1 or the torque supplying device RS, for example, an rpm variation signal of the rotor 1a, or with a signal of the voltage/current detecting unit 6 that detects the output voltage signal and the output current signal of the DC voltage transformer 4.

Examples of the signal indicating the operating state include a signal sent from an rpm sensor (not shown) of the rotor 1a. In the case where the power supply device is mounted on a vehicle, the signal indicating the operating state is, for example, an rpm variation signal obtained from an rpm sensor (not shown) indicating the rpm of the crank shaft of the internal combustion engine to which the rotor 1a is coupled, or from an electronic control unit (not shown) of the internal combustion engine.

Figure 2:
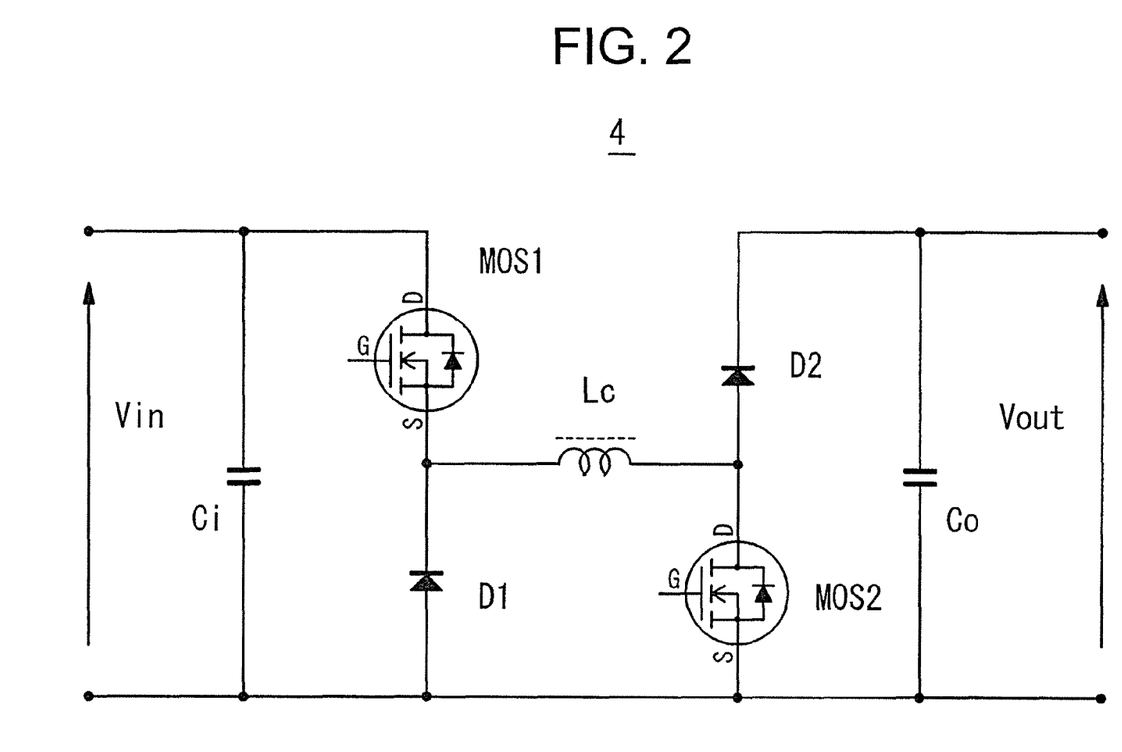
FIG. 2 is a circuit diagram illustrating an exemplary configuration of a DC voltage transformer in the power supply device according to the first embodiment of the present invention.

FIG. 2 is a circuit diagram illustrating an exemplary configuration of the DC voltage transformer 4 in the power supply device according to the first embodiment of the present invention. FIG. 2 illustrates a non-isolated boost buck DC/DC power converter circuit. In FIG. 2, a pair of input terminals for receiving a voltage Vin between output terminals of the rectifying unit 3 is provided to both terminals of a capacitor Ci on the input side.

The capacitor Ci is connected in parallel to a series circuit of a transistor MOS1 formed of a field effect transistor (MOSFET; hereinafter simply referred to as "transistor") as a switching element and a current feedback diode D1. A pair of output terminals to be connected between input terminals of the electrical load 2 is provided to both terminals of a capacitor Co, and the output voltage Vout of the DC voltage transformer 4 is supplied to the electrical load 2.

The capacitor Co is connected in parallel to a series circuit of a transistor MOS2 and a diode D2. An inductor Lc is connected between a node of the transistor MOS1 and the diode D1 and a node of the transistor MOS2 and the diode D2.

Referring back to FIG. 1, the voltage control unit 5 controls a signal to each gate terminal of the transistor MOS1 and the transistor MOS2 in accordance with a signal indicating a variation in rpm of the rotor 1a or an equivalent signal thereto indicating an operating state, and a signal obtained by a voltage/current detecting unit configured to detect an output voltage signal and an output current signal of the DC voltage transformer 4, to thereby adjust a transformation ratio (Vout/Vin) between the capacitor Ci on the input side and the capacitor Co on the output side.

Figure 3A:
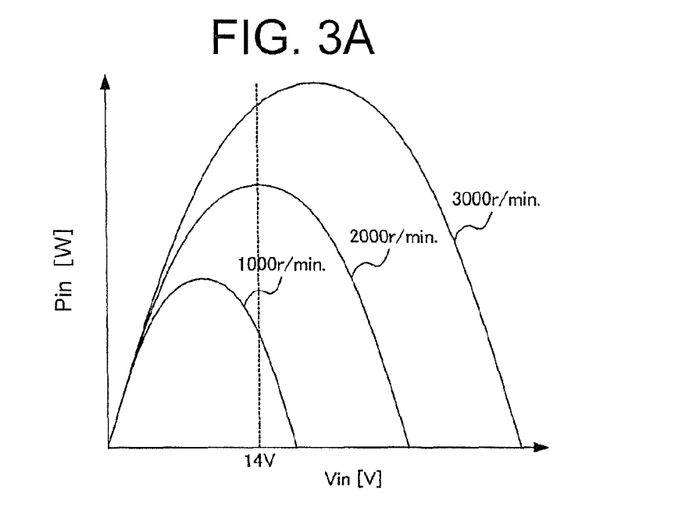
FIGS. 3A to 3C are explanatory diagrams showing power generation characteristics in the power supply device according to the first embodiment of the present invention.
Figure 3B:
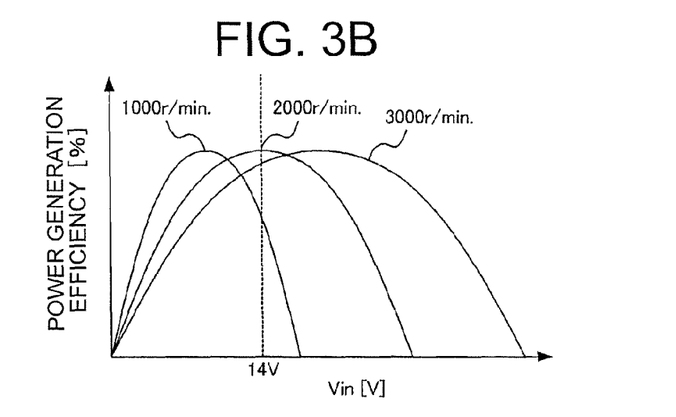
Figure 3C:
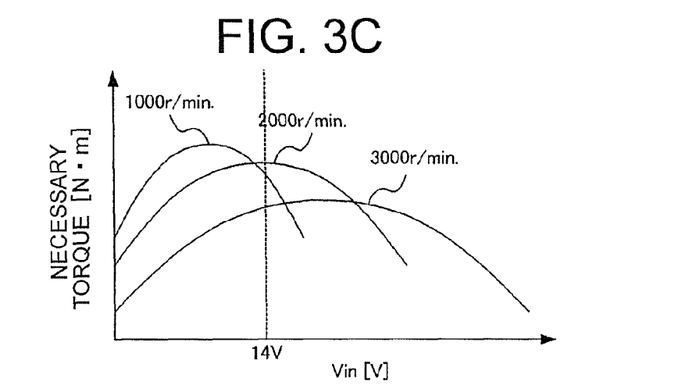

FIGS. 3A to 3C are explanatory diagrams showing power generation characteristics of the magneto generator 1 in the power supply device according to the first embodiment of the present invention. FIG. 3A shows a relationship between the input voltage Vin of the DC voltage transformer 4 and input power Pin of the DC voltage transformer 4 in the case where the rpm of the magneto generator 1 is 1,000 r/min, 2,000 r/min, and 3,000 r/min. FIG. 3B shows a relationship between the input voltage Vin of the DC voltage transformer 4 and power generation efficiency of the magneto generator 1 in the same case. FIG. 3C shows a relationship between the input voltage Vin of the DC voltage transformer 4 and necessary torque of the magneto generator 1 in the same case.

As understood from FIGS. 3A to 3C, in the case where the rpm of the magneto generator 1 is 1,000 r/min, the power generation efficiency is low when power generation is performed with the output of 14 V, and is high in a voltage range lower than 14 V. In the case where the rpm of the magneto generator 1 is 2,000 r/min, the efficiency is high when power generation is performed with the output of 14 V. In the case where the rpm of the magneto generator 1 is 3,000 r/min, the efficiency is high in a voltage range higher than 14 V.

In other words, by controlling the transformation ratio (Vout/Vin) by the voltage control unit 5 at each rpm, the charging can be performed in the state in which the output voltage Vout of the DC voltage transformer 4 is set to 14 V, and hence the output power and the power generation efficiency can be improved more than in the conventional power generation with a single generated voltage. Further, the input voltage Vin of the DC voltage transformer 4 can be controlled to a voltage equal to or lower than the maximum point of the input power Pin of the DC voltage transformer 4, and hence the input voltage Vin of the DC voltage transformer 4 can be decreased to reduce the torque for power generation.

Figure 4:
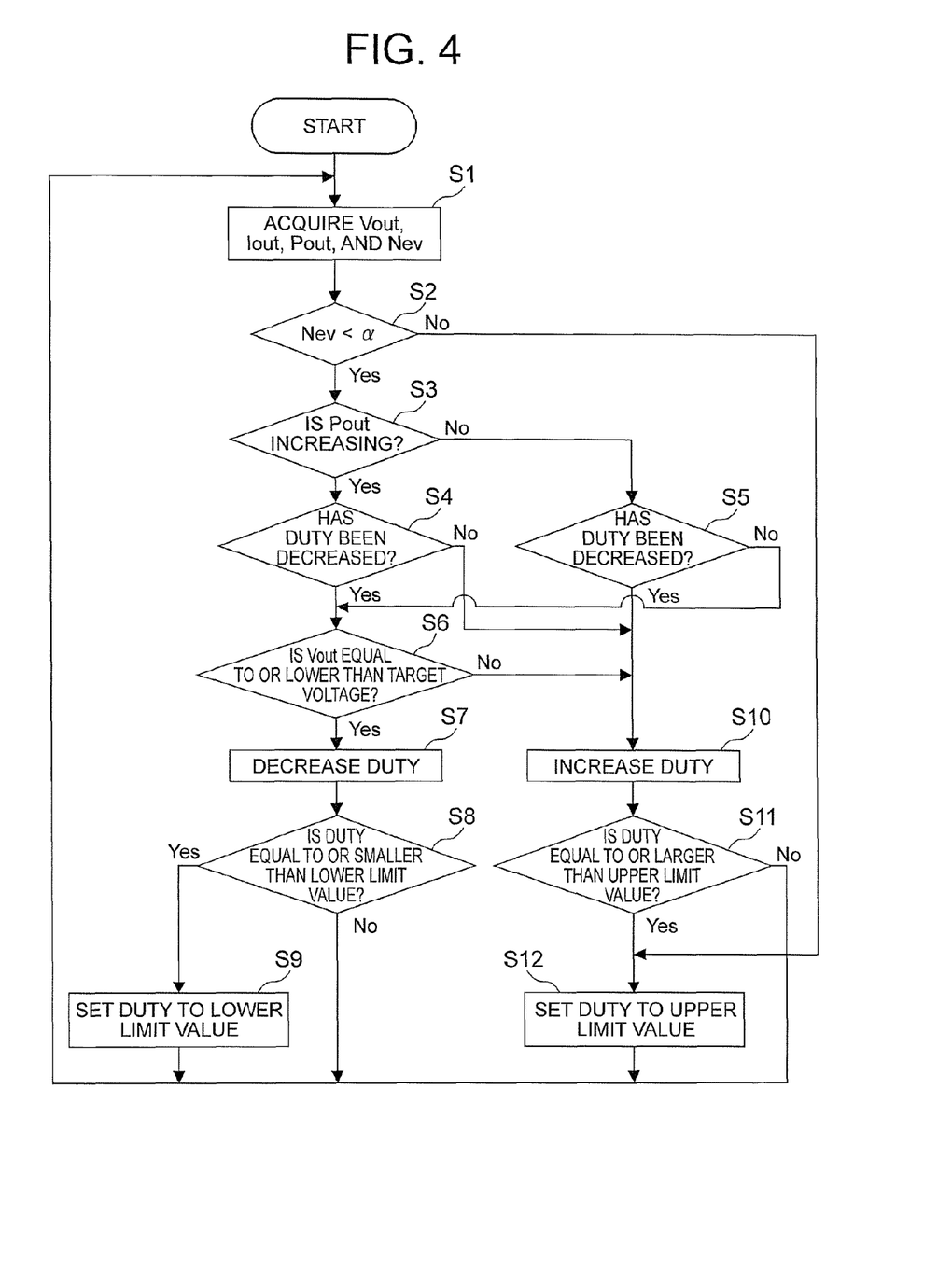
FIG. 4 is a flowchart illustrating control of a transformation ratio in the power supply device according to the first embodiment of the present invention.

Referring to a flowchart of FIG. 4, a description is given of control of the transformation ratio (Vout/Vin) by the power supply device according to the first embodiment of the present invention. For simple description and illustration, the input voltage Vin of the DC voltage transformer 4 is represented by Vin; an input current Iin of the DC voltage transformer 4, Iin; the input power Pin of the DC voltage transformer 4, Pin; the output voltage Vout of the DC voltage transformer 4, Vout; an output current Iout of the DC voltage transformer 4, Iout; output power Pout of the DC voltage transformer 4, Pout; a maximum amount of generated power Pmax at each rpm of the magneto generator 1, Pmax; power consumption Pload of the electrical load 2, Pload; an rpm Ne of the magneto generator 1, Ne; and a variation Nev in rpm of the magneto generator 1, Nev, as appropriate.

The ON duration of the transistor MOS1 and the transistor MOS2 with respect to one switching period is defined by DUTY.

First, Vout and Iout are acquired to calculate Pout, and Nev is acquired (Step S1). Pout (the input power of the electrical load 2) is substantially the same value as the output power of the magneto generator 1.

Subsequently, it is determined whether or not the vehicle state is an accelerating state (Step S2). Specifically, it is determined whether Nev is smaller than a given predetermined constant $\alpha$ or equal to or larger than $\alpha$.

When it is determined in Step S2 that Nev is smaller than the given constant $\alpha$ (that is, Yes), Pout in the current control period is compared to Pout in the previous control period, and it is determined whether or not Pout is increasing (Step S3). Specifically, it is determined whether or not Pout in the current control period is larger than Pout in the previous control period.

When it is determined in Step S3 that Pout is increasing (that is, Yes), it is determined whether or not DUTY has been decreased in the previous control period (Step S4).

On the other hand, when it is determined in Step S3 that Pout is not increasing (that is, No), it is also determined whether or not DUTY has been decreased in the previous control period (Step S5).

When it is determined in Step S4 that DUTY has been decreased (that is, Yes) or when it is determined in Step S5 that DUTY has not been decreased (has been increased) (that is, No), Vin shows a change under a voltage lower than a peak value of the output power of FIG. 3A, and hence it is determined whether or not Vout is equal to or lower than a target voltage (Step S6).

When it is determined in Step S6 that Vout is equal to or lower than the target voltage (that is, Yes), DUTY is decreased in order to increase Pout (Step S7). Specifically, DUTY in the previous control period is decreased by a given fixed value. The decrement of DUTY is always constant. In this manner, Vin becomes larger.

Next, it is determined whether or not DUTY is equal to or smaller than a lower limit value (Step S8). If a lower limit value is not provided for DUTY, Vin may become larger without limit. This determination is necessary in order to prevent this problem.

When it is determined in Step S8 that DUTY is equal to or smaller than the lower limit value (that is, Yes), the lower limit value of DUTY is substituted into DUTY (Step S9), and the flow returns to Step S1.

On the other hand, when it is determined in Step S8 that DUTY is larger than the lower limit value (that is, No), the flow returns to Step S1 without any further control.

On the other hand, when it is determined in Step S4 that DUTY has not been decreased (has been increased) (that is, No) or when it is determined in Step S5 that DUTY has been decreased (that is, Yes), Vin shows a change above a voltage higher than the peak value of the output power of FIG. 3A, and hence DUTY is increased (Step S10).

Also when it is determined in Step S6 that Vout is higher than the target voltage (that is, No), DUTY is increased in Step S10 in order to decrease Pout. Specifically, DUTY in the previous control period is increased by a given fixed value. The increment of DUTY is always constant. In this manner, Vin becomes smaller.

Next, it is determined whether or not DUTY is equal to or larger than an upper limit value (Step S11). If an upper limit value is not provided for DUTY, DUTY may become larger than one switching period. This determination is necessary in order to prevent this problem.

When it is determined in Step S11 that DUTY is equal to or larger than the upper limit value (that is, Yes), the upper limit value of DUTY is substituted into DUTY (Step S12), and the flow returns to Step S1.

Also when it is determined in Step S2 that Nev is equal to or larger than α (that is, No), the upper limit value of DUTY is substituted into DUTY in Step S12.

On the other hand, when it is determined in Step S11 that DUTY is smaller than the upper limit value (that is, No), the flow returns to Step S1 without any further control.

In this manner, the processing of Step S6, Step S7, and Step S10 is executed to perform feedback control so that Vout may match with the target voltage, and hence Vin is converged to a constant voltage.

As described above, according to the first embodiment of the present invention, Vin is controlled in accordance with the load so as to follow the curve of FIG. 3A and controlled to be a voltage lower than Vin corresponding to the maximum point of the output power of the magneto generator 1.

In the case where the electrical load 2 equal to or larger than the output power of the magneto generator 1 is connected, electric power can conventionally be generated only at the point at which Vin is 14 V as shown in FIG. 3B. According to the first embodiment of the present invention, however, electric power can be generated at a point with the highest power generation efficiency.

When Vout becomes equal to or higher than the target voltage, DUTY is increased to decrease Vin, and hence the torque can be reduced as shown in the characteristics of FIG. 3C.

In the case where deceleration is recognized as the vehicle state, the generated voltage is controlled in accordance with the load, and hence deceleration torque can be used more effectively than in the conventional case. In the case where acceleration is recognized as the vehicle state, Vin is controlled and decreased to a voltage lower than Vin corresponding to the maximum point of the output power of the magneto generator 1, and hence the torque to be used for power generation can be reduced as shown in the characteristics of FIG. 3C.

In the case of such rpm that Vin by which Pin becomes maximum is lower than Vout, electric power is conventionally output at a point with low efficiency. According to the first embodiment of the present invention, however, the DC voltage transformer 4 has the boost function, and electric power can be generated up to Pmax with the use of the boost operation, and hence the power generation efficiency can be improved.

As described above, according to the first embodiment, the voltage control unit controls, in accordance with the output voltage signal and the output current signal, the output power of the rectifying unit to a voltage lower than the voltage by which the amount of generated power of the magneto AC generator becomes maximum. When the rpm variation signal indicates the decelerating state or indicates that the variation in rpm is smaller than the predetermined constant, the voltage control unit controls the transformation ratio in accordance with the output voltage signal and the output current signal so as to improve the power generation efficiency of the magneto AC generator. When the rpm variation signal indicates the accelerating state, the voltage control unit controls the transformation ratio so as to decrease the output power of the rectifying unit.

Consequently, the power generation efficiency can be improved more than in the conventional case and the input torque can be reduced with the use of the magneto AC generator.

Second Embodiment

A second embodiment of the present invention relates to a power supply device that is configured to use a transistor MOS1 as an element to be turned ON and OFF in the case of a buck operation in which Vin is higher than Vout and use a transistor MOS2 as an element to be turned ON and OFF in the case of a boost operation in which Vin is lower than Vout, to thereby improve the power generation efficiency more than in the first embodiment.

The overall configuration of the power supply device and the configuration of the DC voltage transformer 4 according to the second embodiment of the present invention are the same as those in FIGS. 1 and 2, respectively, in the first embodiment described above, and hence descriptions thereof are omitted.

Figure 5:
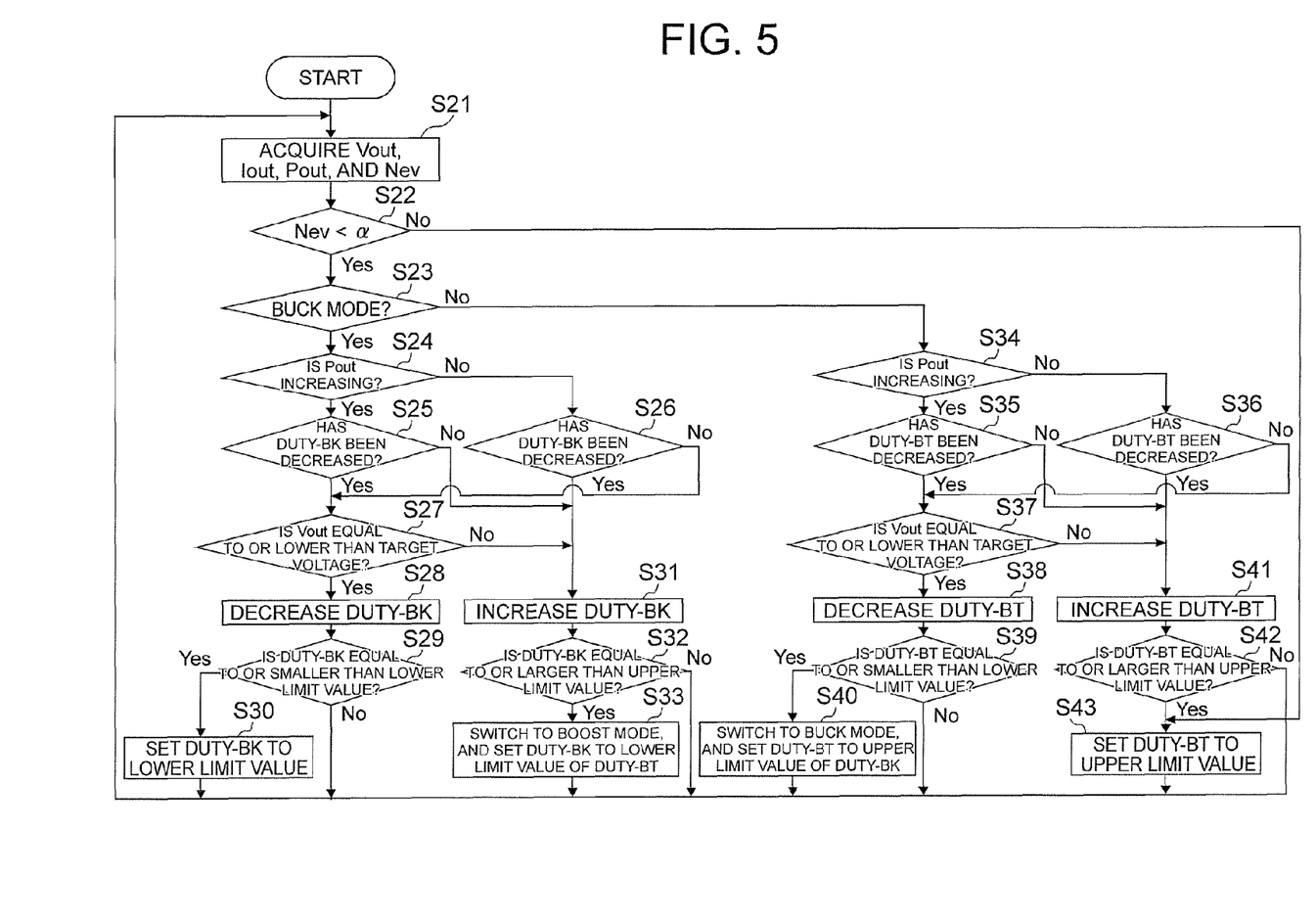
FIG. 5 is a flowchart illustrating control of a transformation ratio in a power supply device according to a second embodiment of the present invention.

Referring to a flowchart of FIG. 5, a description is given of control of the transformation ratio (Vout/Vin) by the power supply device according to the second embodiment of the present invention. Note that, the ON duration of the transistor MOS1 with respect to one switching period is defined by DUTY-BK and the ON duration of the transistor MOS2 with respect to one switching period is defined by DUTY-BT.

A buck mode is a control mode in the state in which Vin is higher than Vout, and a boost mode is a control mode in the state in which Vin is lower than Vout. In the buck mode, DUTY-BT of the transistor MOS2 is 0%, and, in the boost mode, DUTY-BK of the transistor MOS1 is 100%.

First, Vout and Iout are acquired to calculate Pout, and Nev is acquired (Step S21). Pout (the input power of the electrical load 2) is substantially the same value as the output power of the magneto generator 1.

Subsequently, it is determined whether or not the vehicle state is an accelerating state (Step S22). Specifically, it is determined whether Nev is smaller than a given constant α or equal to or larger than α.

When it is determined in Step S22 that Nev is smaller than the given constant α (that is, Yes), it is determined whether or not the control mode is the buck mode (Step S23).

When it is determined in Step S23 that the control mode is the buck mode (that is, Yes), Pout in the current control period is compared to Pout in the previous control period, and it is determined whether or not Pout is increasing (Step S24). Specifically, it is determined whether or not Pout in the current control period is larger than Pout in the previous control period.

When it is determined in Step S24 that Pout is increasing (that is, Yes), it is determined whether or not DUTY-BK has been decreased in the previous control period (Step S25).

On the other hand, when it is determined in Step S24 that Pout is not increasing (that is, No), it is also determined whether or not DUTY-BK has been decreased in the previous control period (Step S26).

When it is determined in Step S25 that DUTY-BK has been decreased (that is, Yes) or when it is determined in Step S26 that DUTY-BK has not been decreased (has been increased) (that is, No), Vin shows a change under a voltage lower than a peak value of the output power of FIG. 3A, and hence it is determined whether or not Vout is equal to or lower than a target voltage (Step S27).

When it is determined in Step S27 that Vout is equal to or lower than the target voltage (that is, Yes), DUTY-BK is decreased in order to increase Pout (Step S28). Specifically, DUTY-BK in the previous control period is decreased by a given fixed value. The decrement of DUTY-BK is always constant. In this manner, Vin becomes larger.

Next, it is determined whether or not DUTY-BK is equal to or smaller than a lower limit value (Step S29). If a lower limit value is not provided for DUTY-BK, Vin may become larger without limit. This determination is necessary in order to prevent this problem.

When it is determined in Step S29 that DUTY-BK is equal to or smaller than the lower limit value (that is, Yes), the lower limit value of DUTY-BK is substituted into DUTY-BK (Step S30), and the flow returns to Step S21.

On the other hand, when it is determined in Step S29 that DUTY-BK is larger than the lower limit value (that is, No), the flow returns to Step S21 without any further control.

On the other hand, when it is determined in Step S25 that DUTY-BK has not been decreased (has been increased) (that is, No) or when it is determined in Step S26 that DUTY-BK has been decreased (that is, Yes), Vin shows a change above a voltage higher than the peak value of the output power of FIG. 3A, and hence DUTY-BK is increased (Step S31).

Also when it is determined in Step S27 that Vout is higher than the target voltage (that is, No), DUTY-BK is increased in Step S31 in order to decrease Pout. Specifically, DUTY-BK in the previous control period is increased by a given fixed value. The increment of DUTY-BK is always constant. In this manner, Vin becomes smaller.

Next, it is determined whether or not DUTY-BK is equal to or larger than an upper limit value (Step S32). If an upper limit value is not provided for DUTY-BK, DUTY-BK may become larger than one switching period. This determination is necessary in order to prevent this problem.

When it is determined in Step S32 that DUTY-BK is equal to or larger than the upper limit value (that is, Yes), the control mode is changed to the boost mode, and a lower limit value of DUTY-BT is substituted into DUTY-BK (Step S33). Then, the flow returns to Step S21.

On the other hand, when it is determined in Step S32 that DUTY-BK is smaller than the upper limit value (that is, No), the flow returns to Step S21 without any further control.

Subsequently, when it is determined in Step S23 that the control mode is not the buck mode (but the boost mode) (that is, No), Pout in the current control period is compared to Pout in the previous control period, and it is determined whether or not Pout is increasing (Step S34).

The subsequent control of Step S34 to Step S38 and Step S41 is the same routine as the above-mentioned control from Step S24 to Step S28 and Step S31, except that DUTY-BK is replaced by DUTY-BT, and hence descriptions thereof are omitted.

Next, it is determined whether or not DUTY-BT is equal to or smaller than the lower limit value (Step S39). If a lower limit value is not provided for DUTY-BT, Vin may become larger without limit. This determination is necessary in order to prevent this problem.

When it is determined in Step S39 that DUTY-BT is equal to or smaller than the lower limit value (that is, Yes), the control mode is changed to the buck mode, and the upper limit value of DUTY-BK is substituted into DUTY-BT (Step S40). Then, the flow returns to Step S21.

On the other hand, when it is determined in Step S39 that DUTY-BT is larger than the lower limit value (that is, No), the flow returns to Step S21 without any further control.

Further, it is determined whether or not DUTY-BT is equal to or larger than an upper limit value (Step S42). If an upper limit value is not provided for DUTY-BT, DUTY-BT may become larger than one switching period. This determination is necessary in order to prevent this problem.

When it is determined in Step S42 that DUTY-BT is equal to or larger than the upper limit value (that is, Yes), the upper limit value of DUTY-BT is substituted into DUTY-BT (Step S43), and the flow returns to Step S21.

Also when it is determined in Step S22 that Nev is equal to or larger than α (that is, No), the upper limit value of DUTY-BT is substituted into DUTY-BT in Step S43.

On the other hand, when it is determined in Step S42 that DUTY-BT is smaller than the upper limit value (that is, No), the flow returns to Step S21 without any further control.

In this manner, the processing of Step S27, Step S28, and Step S31, and Step S37, Step 38, and Step 41, is executed to perform feedback control so that Vout may match with the target voltage, and hence Vin is converged to a constant voltage.

As described above, according to the second embodiment of the present invention, different transistors MOS are operated in the buck mode and the boost mode, and hence the power generation efficiency can be improved.

Vin can be controlled in accordance with the load so as to follow the curve of FIG. 3A and controlled to be a voltage lower than Vin corresponding to the maximum point of the output power of the magneto generator 1.

In the case where the electrical load 2 equal to or larger than the output power of the magneto generator 1 is connected, electric power can conventionally be generated only at the point at which Vin is 14 V as shown in FIG. 3B. According to the second embodiment of the present invention, however, electric power can be generated at a point with the highest power generation efficiency.

When Vout becomes equal to or higher than the target voltage, DUTY is increased to decrease Vin, and hence the torque can be reduced as shown in the characteristics of FIG. 3C.

In the case where deceleration is recognized as the vehicle state, the generated voltage is controlled in accordance with the load, and hence deceleration torque can be used more effectively than in the conventional case. In the case where acceleration is recognized as the vehicle state, Vin is controlled and decreased to a voltage lower than Vin corresponding to the maximum point of the output power of the magneto generator 1, and hence the torque to be used for power generation can be reduced as shown in the characteristics of FIG. 3C.

In the case of such rpm that Vin by which Pin becomes maximum is lower than Vout, electric power is conventionally output at a point with low efficiency. According to the second embodiment of the present invention, however, the DC voltage transformer 4 has the boost function, and electric power can be generated up to Pmax with the use of the boost operation, and hence the power generation efficiency can be improved.

Third Embodiment

Figure 6:
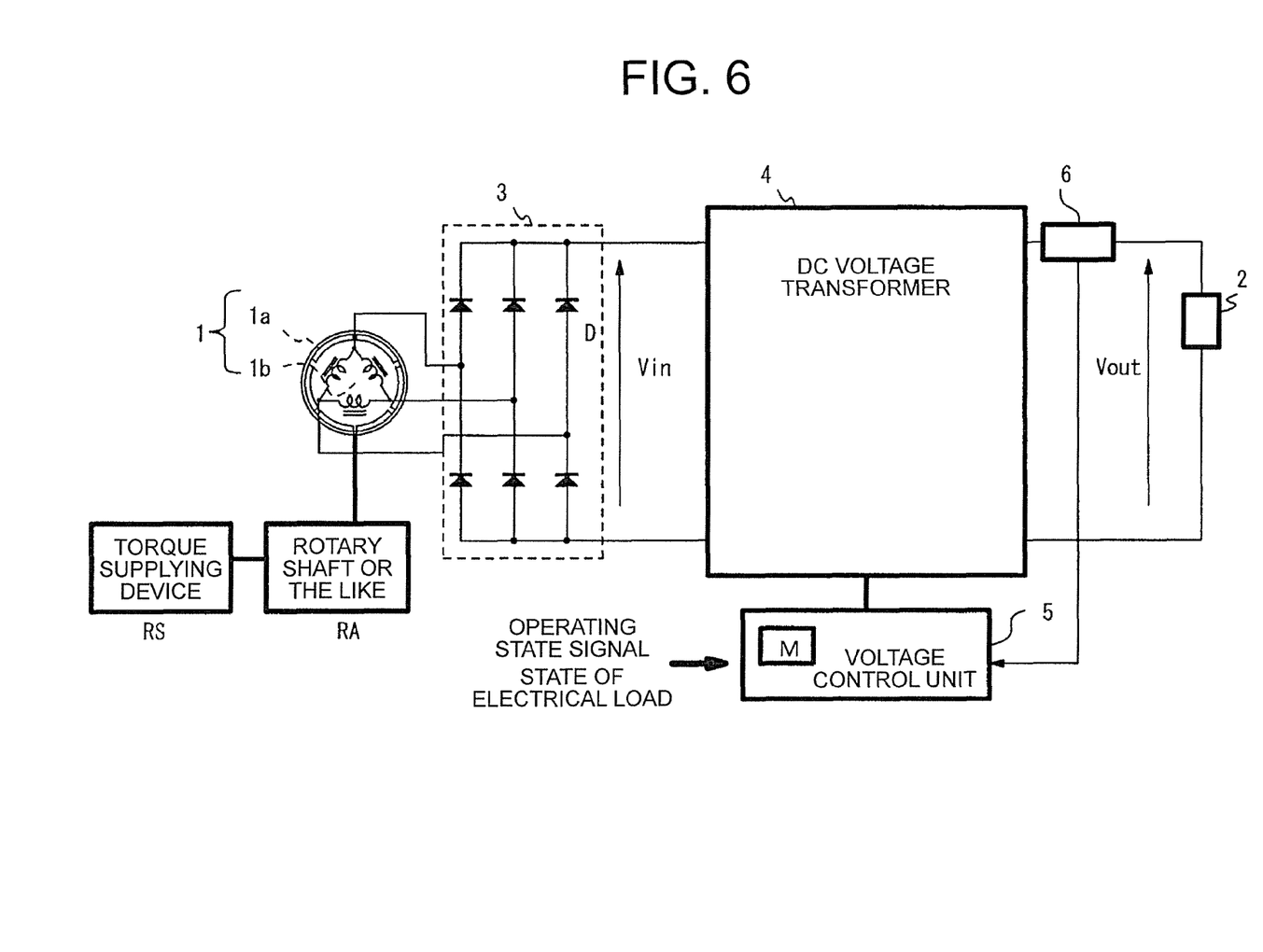
FIG. 6 is an overall configuration diagram illustrating a power supply device according to a third embodiment of the present invention.

A third embodiment of the present invention relates to a power supply device that is configured to store output voltage-output power characteristics (input voltage-input power characteristics of the DC voltage transformer 4) corresponding to the operating state (rpm) of the magneto generator 1 and control the transformation ratio (Vout/Vin) of the DC voltage transformer 4 based on a result of comparing the rpm of the rotor 1a, the variation in rpm, and the state of the electrical load 2 to the stored output voltage-output power characteristics, to thereby improve the power generation efficiency and reduce the torque.

FIG. 6 is an overall configuration diagram illustrating the power supply device according to the third embodiment of the present invention. In FIG. 6, the power supply device includes a memory section M in the voltage control unit 5 for storing the output voltage-output power characteristics corresponding to the operating state (rpm) of the magneto generator 1. The other configurations of the power supply device and the configuration of the DC voltage transformer 4 are the same as those of FIGS. 1 and 2, respectively, in the first embodiment described above, and hence descriptions thereof are omitted.

Figure 7:
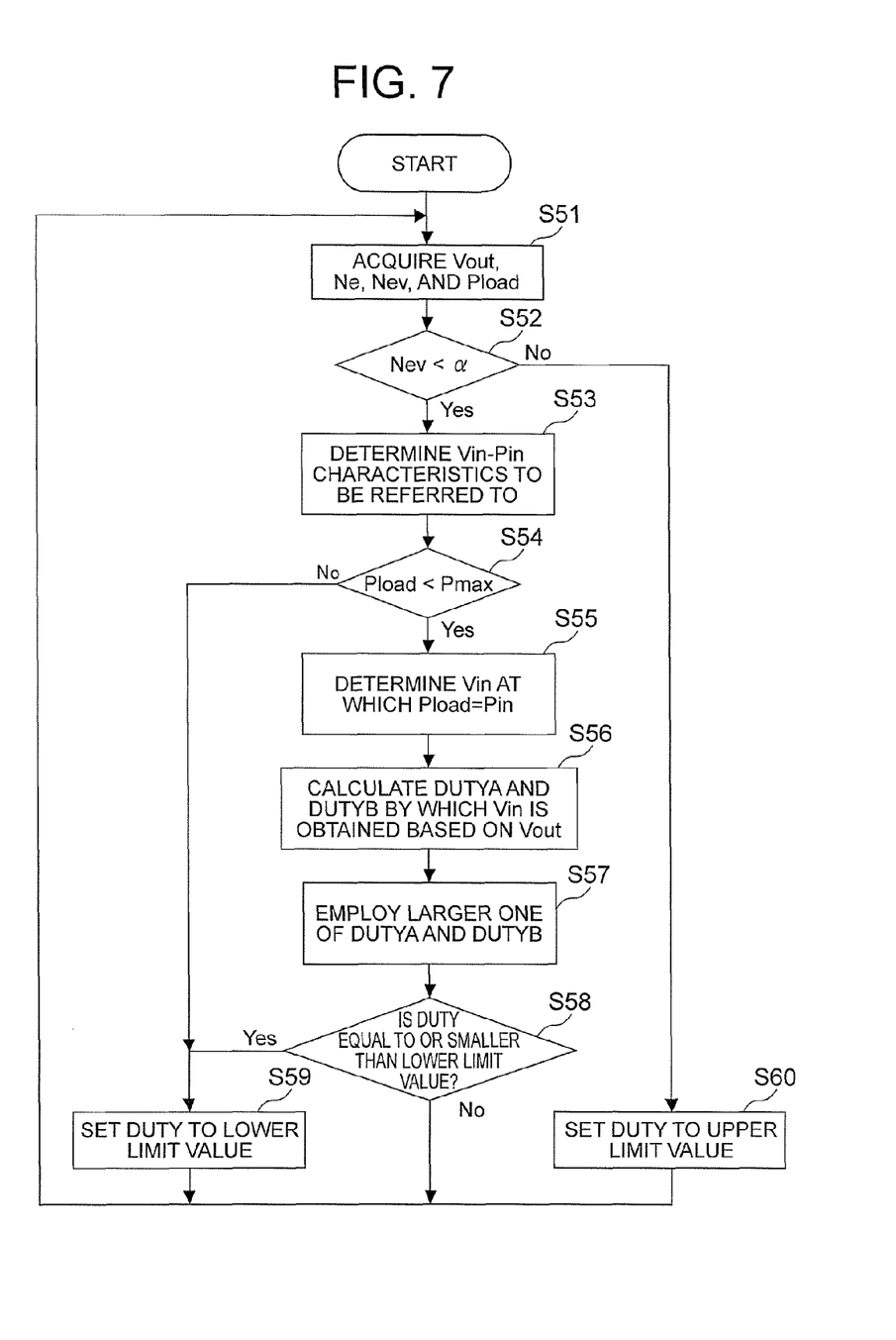
FIG. 7 is a flowchart illustrating control of a transformation ratio in the power supply device according to the third embodiment of the present invention.

Referring to a flowchart of FIG. 7, a description is given of control of the transformation ratio (Vout/Vin) by the power supply device according to the third embodiment of the present invention.

First, Vout, Ne, Nev, and Pload are acquired (Step S51).

Subsequently, it is determined whether or not the vehicle state is an accelerating state (Step S52). Specifically, it is determined whether Nev is smaller than a given constant a or equal to or larger than $\alpha$.

When it is determined in Step S52 that Nev is smaller than the given constant $\alpha$ (that is, Yes), the characteristics to be used are determined based on the acquired rpm Ne from among the Vin–Pin characteristics for each rpm stored in the memory section M of the voltage control unit 5 (Step S53).

Next, Pmax at the acquired rpm Ne is compared to Pload to determine whether or not Pload is smaller than Pmax (Step S54).

When it is determined in Step S54 that Pload is smaller than Pmax (that is, Yes), Vin by which Pload and Pin become equal to each other is determined based on the Vin–Pin characteristics employed in Step S53 (Step S55).

Subsequently, DUTY for obtaining Vin determined in Step S55 is calculated (Step S56). DUTY for obtaining Vin determined in Step S55 has two kinds of DUTYA and DUTYB, each of which is calculated based on the ratio between Vin and Vout.

Next, DUTYA and DUTYB calculated in Step S56 are compared to each other, and one of DUTYA and DUTYB having a larger numerical value is employed as DUTY (Step S57). This comparison is performed in order to operate the magneto generator 1 at a voltage lower than the maximum power point of Pin in the characteristics of FIG. 3A.

Subsequently, it is determined whether or not DUTY is equal to or smaller than a lower limit value (Step S58). If a lower limit value is not provided for DUTY, Vin may become larger without limit. This determination is necessary in order to prevent this problem.

When it is determined in Step S58 that DUTY is equal to or smaller than the lower limit value (that is, Yes), the lower limit value of DUTY is substituted into DUTY (Step S59), and the flow returns to Step S51.

On the other hand, when it is determined in Step S58 that DUTY is larger than the lower limit value (that is, No), the flow returns to Step S51 without any further control.

Also when it is determined in Step S54 that Pload is equal to or larger than Pmax (that is, No), the lower limit value of DUTY calculated based on the Vin–Pin characteristics determined in Step S53 is substituted into DUTY in Step S59.

Further, when it is determined in Step S52 that Nev is equal to or larger than $\alpha$ (that is, No), the upper limit value of DUTY is substituted into DUTY (Step S60), and the flow returns to Step S51.

As described above, according to the third embodiment of the present invention, DUTY is determined based on the stored Vin–Pin characteristics, and hence the control can be simplified as compared to the first embodiment.

Vin can be controlled in accordance with the load so as to follow the curve of FIG. 3A and controlled to be a voltage lower than Vin corresponding to the maximum point of the output power of the magneto generator 1.

In the case where the electrical load 2 equal to or larger than the output power of the magneto generator 1 is connected, electric power can conventionally be generated only at the point at which Vin is 14 V as shown in FIG. 3B. According to the third embodiment of the present invention, however, electric power can be generated at a point with the highest power generation efficiency.

When Vout becomes equal to or higher than the target voltage, DUTY is increased to decrease Vin, and hence the torque can be reduced as shown in the characteristics of FIG. 3C.

In the case where deceleration is recognized as the vehicle state, the generated voltage is controlled in accordance with the load, and hence the deceleration torque can be used more effectively than in the conventional case. In the case where acceleration is recognized as the vehicle state, Vin is controlled and decreased to a voltage lower than Vin corresponding to the maximum point of the output power of the magneto generator 1, and hence the torque to be used for power generation can be reduced as shown in the characteristics of FIG. 3C.

In the case of such rpm that Vin at which Pin is maximum is lower than Vout, electric power is conventionally output at a point with low efficiency. According to the third embodiment of the present invention, however, the DC voltage transformer 4 has the boost function, and electric power can be generated up to Pmax with the use of the boost operation, and hence the power generation efficiency can be improved.

Note that, DUTY that is set in the third embodiment can be used as an initial value of DUTY for controlling the transformation ratio (Vout/Vin) described in the first embodiment.

Figure 8:
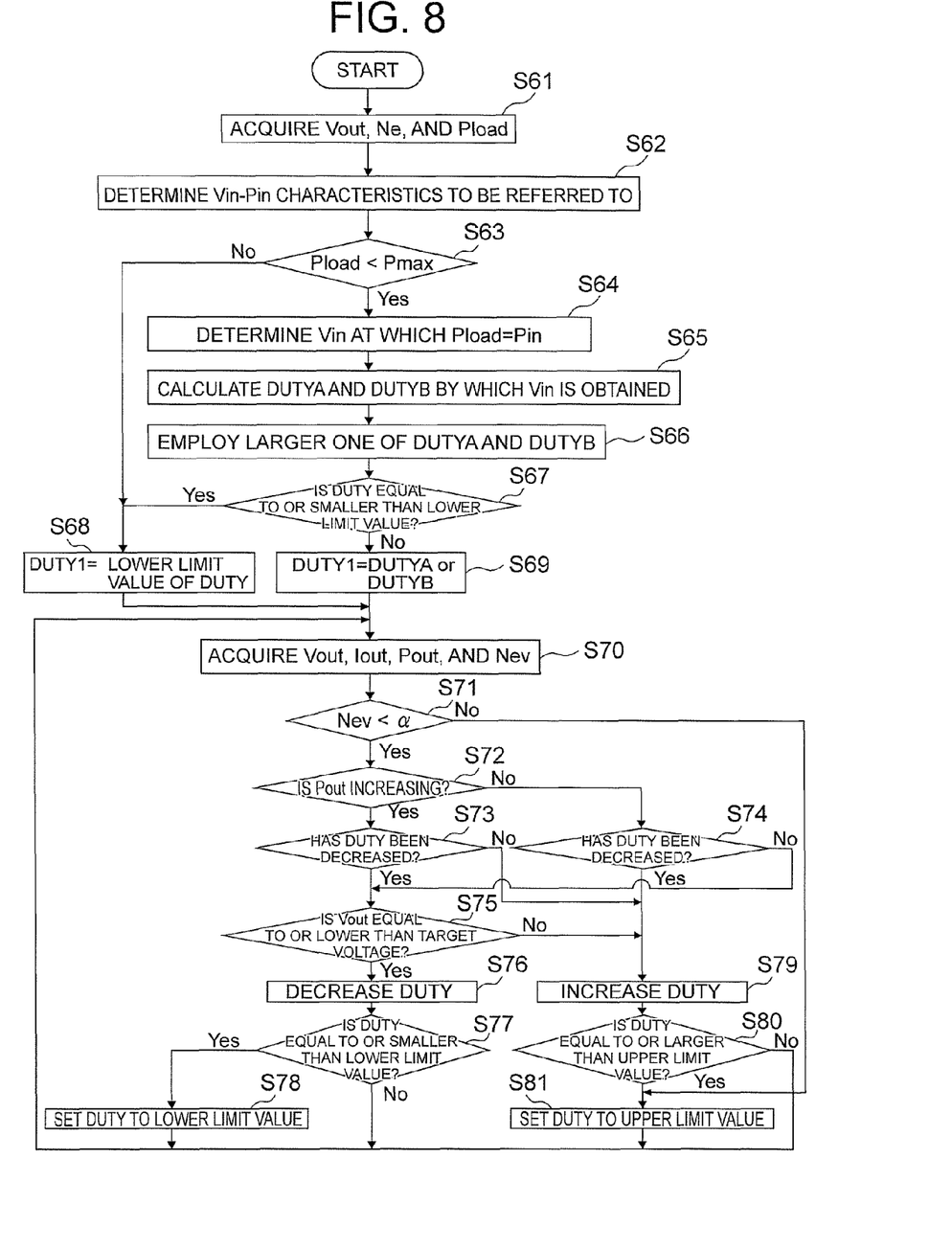
FIG. 8 is a flowchart illustrating another control of the transformation ratio in the power supply device according to the third embodiment of the present invention.

Referring to a flowchart of FIG. 8, a description is given of another control of the transformation ratio (Vout/Vin) by the power supply device according to the third embodiment of the present invention.

First, the control from Steps S61 to S67 is the same routine as the control from Steps S51 to S58 (except for Step S52) described in the third embodiment, and hence descriptions thereof are omitted.

Subsequently, when it is determined in Step S67 that DUTY is equal to or smaller than the lower limit value (that is, Yes), the lower limit value of DUTY is substituted into DUTY (Step S68), and the flow proceeds to Step S70.

Also when it is determined in Step S63 that Pload is equal to or larger than Pmax (that is, No), the lower limit value of DUTY calculated based on the Vin–Pin characteristics determined in Step S62 is substituted into DUTY in Step S68.

On the other hand, when it is determined in Step S67 that DUTY is larger than the lower limit value (that is, No), one of DUTYA and DUTYB employed in Step S66 is substituted into DUTY (Step S69), and the flow proceeds to Step S70.

The subsequent control of Steps S70 to S81 is the same routine as the control from Steps S1 to S12 described in the first embodiment, and hence descriptions thereof are omitted.

As described above, DUTY that is set in the third embodiment is used as an initial value of DUTY for controlling the transformation ratio (Vout/Vin) described in the first embodiment, and hence the time taken for Vin to converge to a constant voltage can be shortened.

Note that, the present invention is not limited to the respective embodiments described above and includes any possible combination of those embodiments as a matter of course.

What is claimed is:

1. A power supply device, comprising:
a magneto AC generator comprising:
a rotor including a permanent magnet; and
a stator configured to generate an AC current in a stator winding by rotation of the rotor;
a rectifier configured to rectify the AC current generated by the magneto AC generator into a DC current;
an electrical load to be supplied with electric power generated by the magneto AC generator;
a DC voltage transformer having a variable transformation ratio, which is configured to transform an output voltage of the rectifier into an input voltage between input terminals of the electrical load;
a voltage/current detector configured to detect an output voltage signal and an output current signal of the DC voltage transformer; and
a voltage controller configured to control the transformation ratio of the DC voltage transformer in a stepless manner within a set range based on an operating state signal including an rpm variation signal relating to the rotation of the rotor, the output voltage signal, and the output current signal,
wherein the voltage controller is configured to:
control, in accordance with the output voltage signal and the output current signal, output power of the rectifier to a voltage lower than a voltage by which an amount of generated power of the magneto AC generator becomes maximum;
control the transformation ratio in accordance with the output voltage signal and the output current signal so as to improve power generation efficiency of the magneto AC generator one of when the rpm variation signal indicates an decelerating state and when the rpm variation signal indicates that a variation in rpm indicates a value smaller than a predetermined constant; and
control the transformation ratio so as to decrease the output power of the rectifier when the rpm variation signal indicates an accelerating state.

2. A power supply device according to claim 1, wherein:
the DC voltage transformer comprises a switching element; and
the voltage controller is configured to control the transformation ratio by controlling an ON duration of the switching element with respect to one switching period.

3. A power supply device according to claim 2, wherein:
the voltage controller comprises a memory section for storing a relationship between an input voltage and input power of the DC voltage transformer corresponding to an operating state of the magneto AC generator;
the operating state signal comprises an rpm signal relating to the rotation of the rotor; and
the voltage controller is configured to compare, based on the rpm signal, a state of the electrical load to the input power of the DC voltage transformer stored in the memory section, and set an initial transformation ratio after start of the DC voltage transformer in accordance with a result of the comparison.

4. A power supply device according to claim 2, wherein the voltage controller is configured to switch a switching element included in the DC voltage transformer based on the operating state signal and a state of the electrical load.

5. A power supply device according to claim 2, wherein the voltage controller is configured to control the transformation ratio so as to decrease the output power of the rectifier when an output voltage of the DC voltage transformer detected by the voltage/current detector is higher than a target voltage.

6. A power supply device according to claim 2, wherein:
the DC voltage transformer has a boost function; and
the voltage controller is configured to control a boost ratio of the DC voltage transformer based on the operating state signal so as to improve the power generation efficiency of the magneto AC generator when the output power of the rectifier by which the amount of generated power of the magneto AC generator becomes maximum is lower than the input voltage between the input terminals of the electrical load.

7. A power supply device according to claim 1, wherein:
the voltage controller comprises a memory section for storing a relationship between an input voltage and input power of the DC voltage transformer corresponding to an operating state of the magneto AC generator;

the operating state signal comprises an rpm signal relating to the rotation of the rotor; and the voltage controller is configured to compare, based on the rpm signal, a state of the electrical load to the input power of the DC voltage transformer stored in the memory section, and set an initial transformation ratio after start of the DC voltage transformer in accordance with a result of the comparison.

8. A power supply device according to claim 1, wherein the voltage controller is configured to switch a switching element included in the DC voltage transformer based on the operating state signal and a state of the electrical load.

9. A power supply device according to claim 1, wherein the voltage controller is configured to control the transformation ratio so as to decrease the output power of the rectifier when an output voltage of the DC voltage transformer detected by the voltage/current detector is higher than a target voltage.

10. A power supply device according to claim 1, wherein:
the DC voltage transformer has a boost function; and
the voltage controller is configured to control a boost ratio of the DC voltage transformer based on the operating state signal so as to improve the power generation efficiency of the magneto AC generator when the output power of the rectifier by which the amount of generated power of the magneto AC generator becomes maximum is lower than the input voltage between the input terminals of the electrical load.

11. A method of controlling a power supply device, the power supply device comprising:
a magneto AC generator comprising:
a rotor including a permanent magnet; and
a stator configured to generate an AC current in a stator winding by rotation of the rotor;

a rectifier configured to rectify the AC current generated by the magneto AC generator into a DC current;

an electrical load to be supplied with electric power generated by the magneto AC generator;

a DC voltage transformer having a variable transformation ratio, which is configured to transform an output voltage of the rectifier into an input voltage between input terminals of the electrical load;

a voltage/current detector configured to detect an output voltage signal and an output current signal of the DC voltage transformer; and a voltage controller configured to control the transformation ratio of the DC voltage transformer in a stepless manner within a set range based on an operating state signal including an rpm variation signal relating to the rotation of the rotor, the output voltage signal, and the output current signal, the method comprising:

controlling, in accordance with the output voltage signal and the output current signal, output power of the rectifier to a voltage lower than a voltage by which an amount of generated power of the magneto AC generator becomes maximum;

controlling the transformation ratio in accordance with the output voltage signal and the output current signal so as to improve power generation efficiency of the magneto AC generator one of when the rpm variation signal indicates an decelerating state and when the rpm variation signal indicates that a variation in rpm indicates a value smaller than a predetermined constant; and controlling the transformation ratio so as to decrease the output power of the rectifier when the rpm variation signal indicates an accelerating state.

\* \* \* \* \*